OR  3,909,105

United States

Neiswander et al.

[11] 3,909,105

[45] Sept. 30, 1975

[54] OPTICAL IMAGE SCANNER WITH BEAM STABILIZATION

[75] Inventors: Robert S. Neiswander, Santa Barbara, Calif.; Clyde W. Harris, Sante Fe, N. Mex.

[73] Assignee: The Te Company, Santa Barbara, Calif.

[22] Filed: June 17, 1974

[21] Appl. No.: 479,877

[52] U.S. Cl. .................... 350/7; 350/285; 178/7.6; 250/236
[51] Int. Cl.² ........................................ G02B 27/17
[58] Field of Search .......... 350/7, 6, 285, 286, 287, 350/102; 178/7.6; 356/24; 250/236

[56] References Cited
UNITED STATES PATENTS

| | | | |
|---|---|---|---|
| 3,460,892 | 8/1969 | Dolin | 350/7 |
| 3,604,932 | 9/1971 | Beach | 350/7 |
| 3,705,755 | 12/1972 | Baer | 350/6 |
| 3,764,192 | 10/1973 | Wheeler | 350/285 |
| 3,782,835 | 11/1974 | Abel | 350/7 |
| 3,790,246 | 2/1974 | Pickering | 350/7 |
| 3,862,759 | 4/1974 | Andersson | 350/7 |

*Primary Examiner*—Vincent P. McGraw
*Assistant Examiner*—Jon W. Henry

[57] ABSTRACT

A region to be scanned is imaged in an arcuate surface, typically by a concave mirror, and the primary image is scanned by a rotating array of optical probes, typically roof reflectors or triple reflectors. Oscillation of the scanner exit cone with the scanning movement is compensated at a relay image. Improved correction of the primary spherical aberration is produced by a corrector in the stabilized beam conjugate to the center of curvature of the objective, leaving the physical center free to accommodate a pointing mirror or the like. Periodic focal shift due to the beam stabilizer, typically an oscillating mirror or rotating mirror array, is nulled by selecting the radius of the roof or triple reflector array different from its normal value of half the primary image radius. In particular, the stabilizing mirrors may be mounted and driven with the scanning reflectors. Triple reflectors as scanning probes provide lateral beam offset, permitting increased effective aperture and facilitating raster scan. A preferred calibrating system also uses a triple reflector.

25 Claims, 18 Drawing Figures

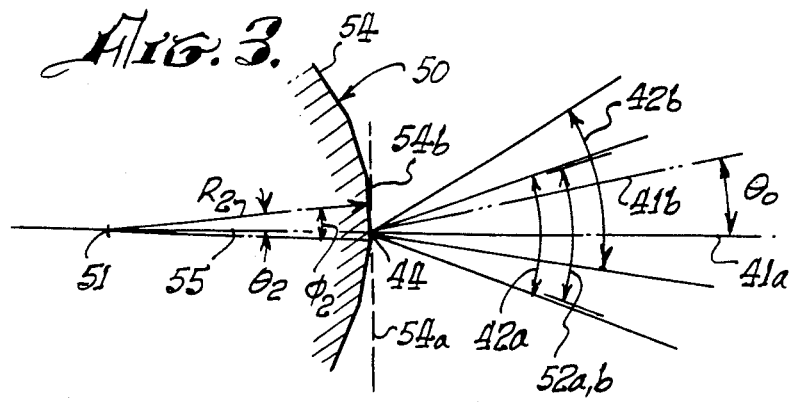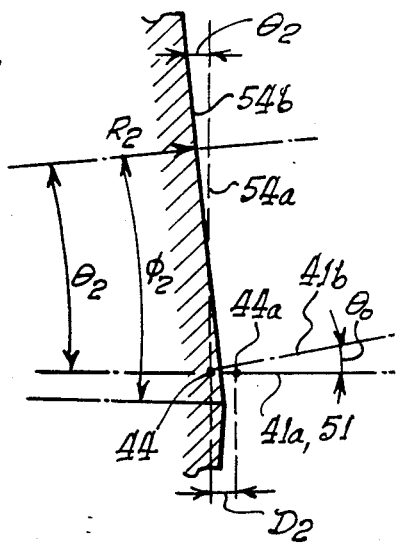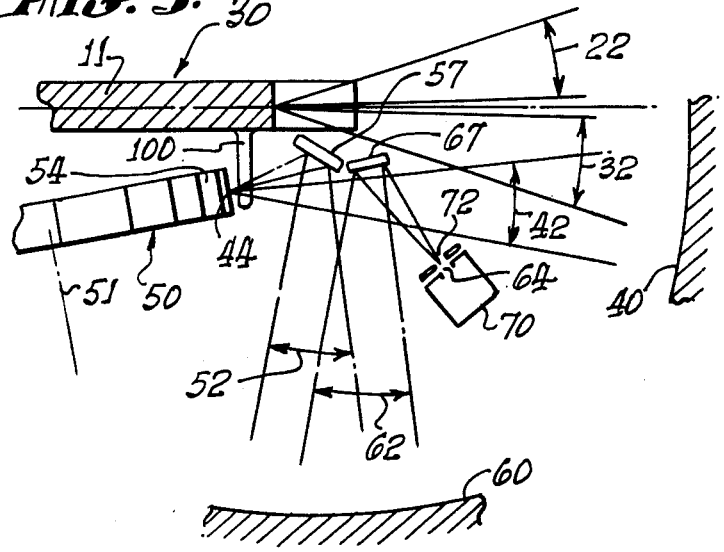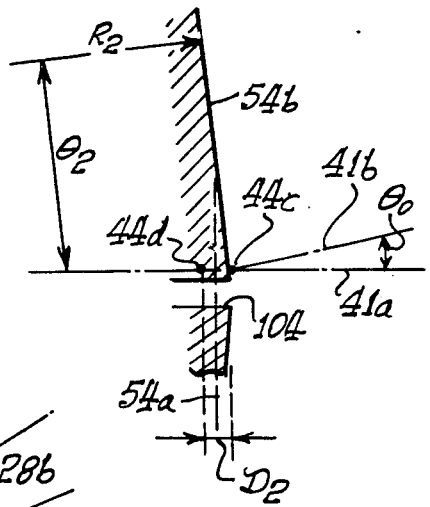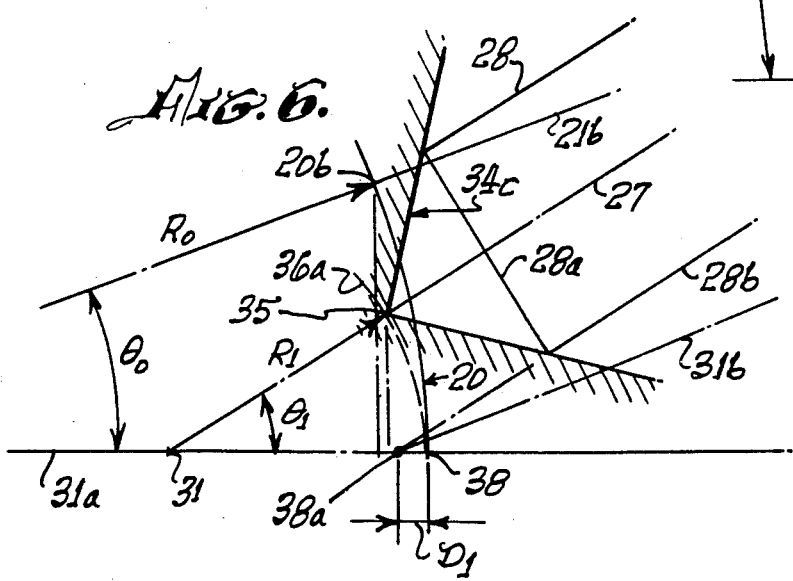

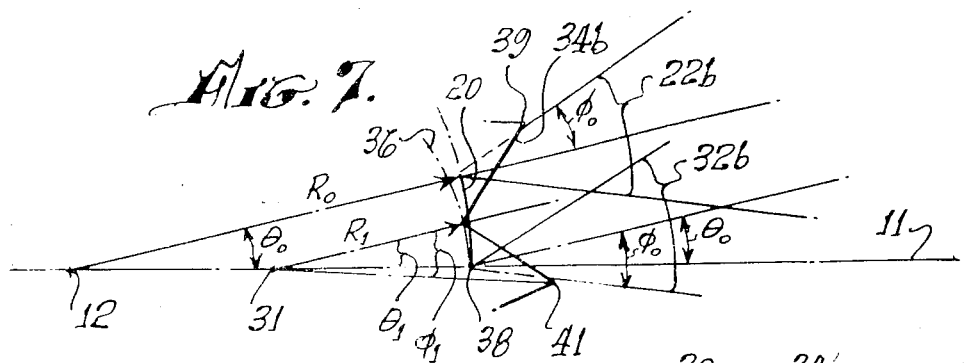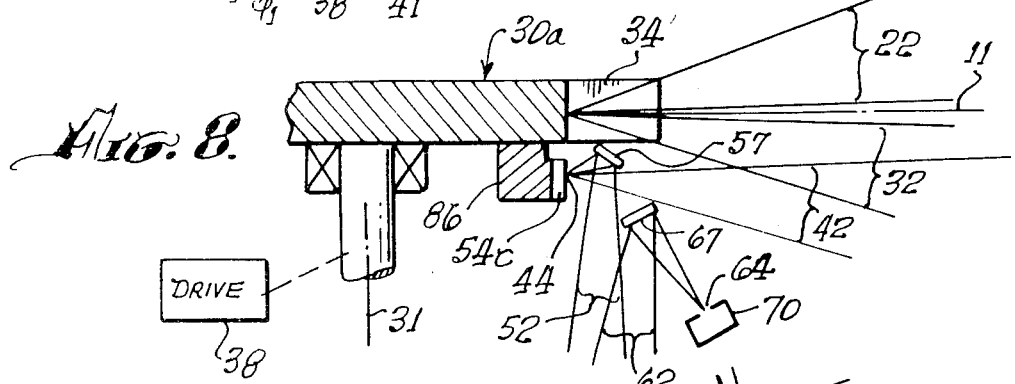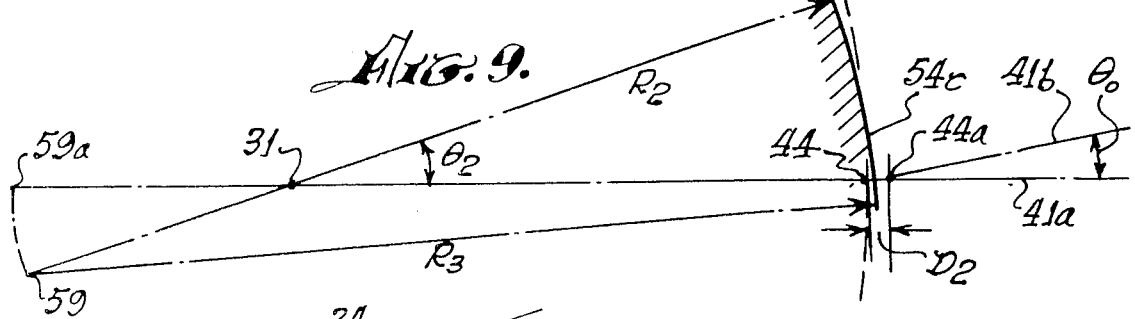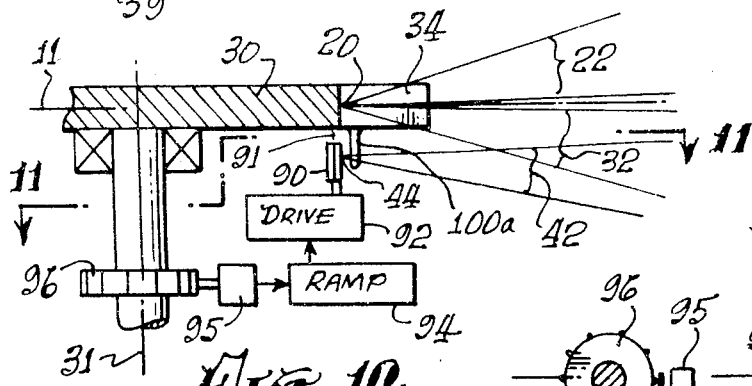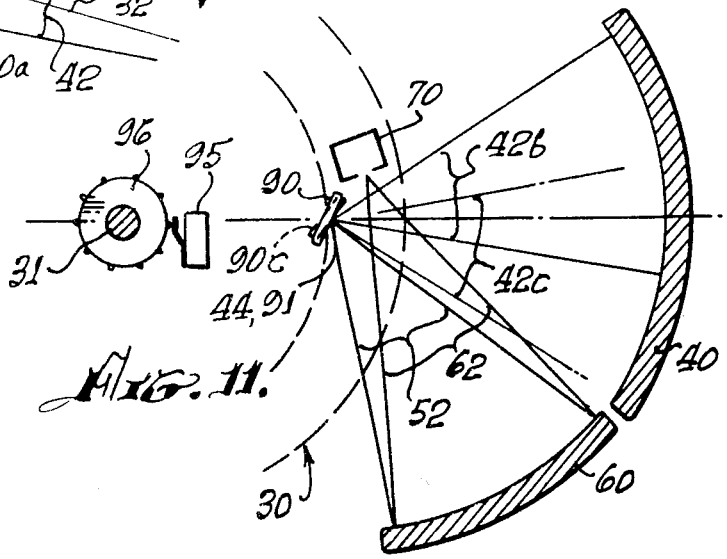

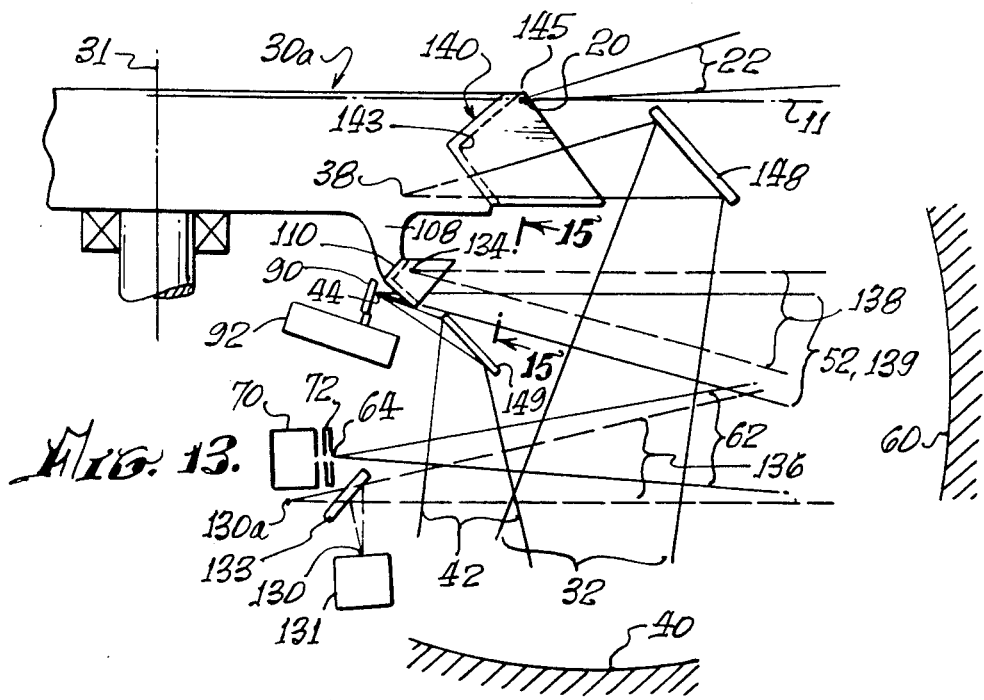
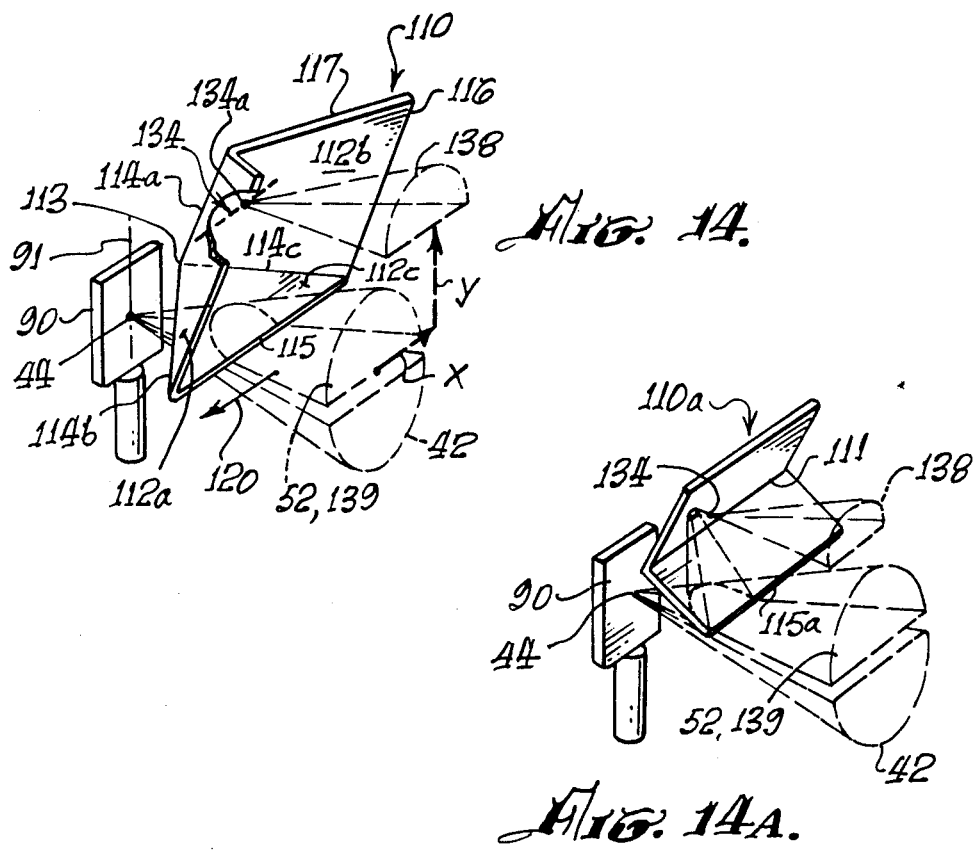

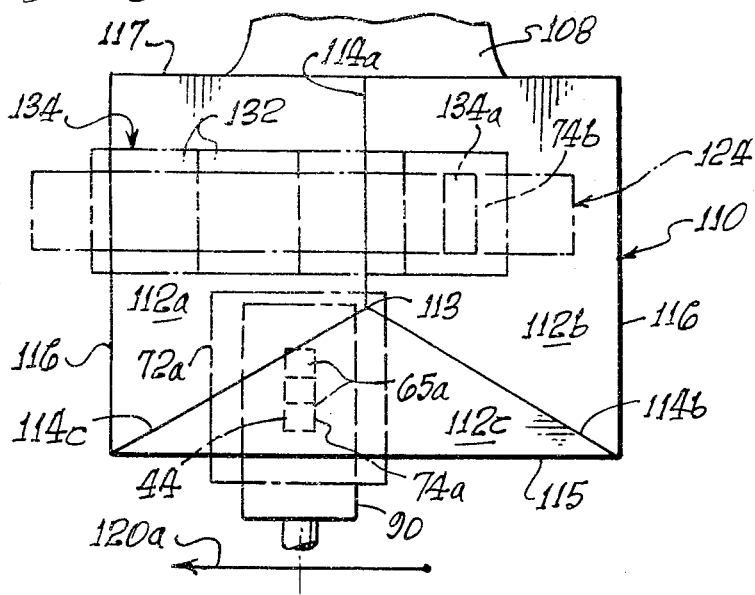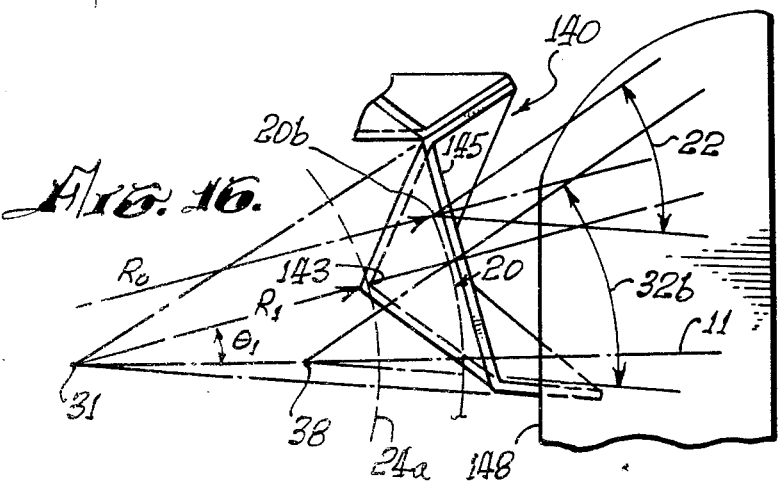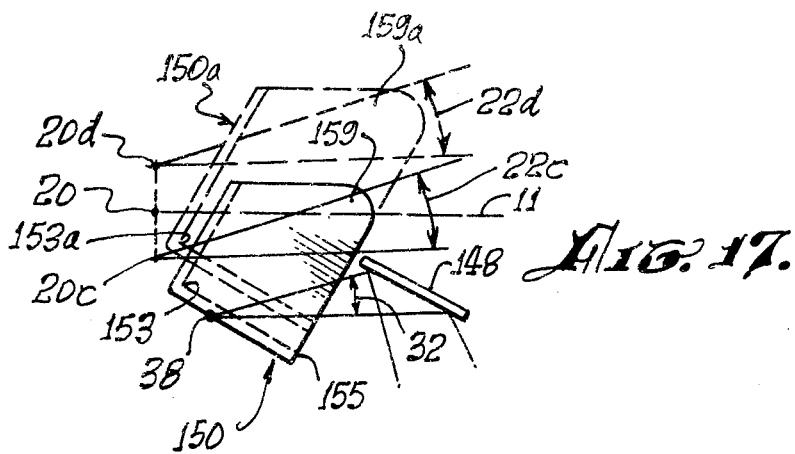

OPTICAL IMAGE SCANNER WITH BEAM STABILIZATION

FIELD OF THE INVENTION

This invention concerns optical image scanning systems in which a small radiation terminus is imaged at an extended region to be scanned, with optical means for causing the image to sweep periodically across the region.

The radiation terminus may comprise a radiation source which is imaged at an elemental area that scans a screen, for example, as to display variations of the source intensity; or the terminus may comprise a sensor which receives radiation from an elemental area that scans a nearby or distant scene, for example, as to produce a video signal representing the scene. In either case, the terminus may typically be an element of substantially point size, or a linear array of such elements or a continuous line extending in the cross-scan direction.

The invention related especially to mechanism for performing such optical scanning in one dimension. If two-dimensional scanning is required, coordinating scanning in an orthogonal dimension may be provided in any suitable manner, as by incorporating additional optical scanning mechanism of know type or by bodily translation or rotation of the entire scanning system, for example. For the sake of clarity, and without intending any limitation of scope, the invention will be described primarily with respect to a system for scanning a distant scene in only one dimension, as is useful, for example, for strip mapping of the ground from a moving aircraft.

The invention relates more particularly to optical scanning systems of the described type in which the scene strip to be scanned is first imaged optically in a primary image surface, and that primary image is scanned periodically by optical scanning mechanism which images a progressively varying elementary area of the primary image at a fixed position, and ultimately at the radiation terminus.

Such a system imposes rather severe field requirements upon the primary optical system, which must accommodate the entire length of the scene strip along which the scan takes place. Among the most useful optical imaging systems for that purpose are those having a focal surface that is curved approximately spherically. Such image curvature greatly facilitates optical scanning of the image, since the scanning optics, whatever their detailed construction, can be mounted for rotational movement about the approximate center of curvature of the image and can move continuously, typically at constant speed. Most optical systems having an approximately spherically curved focal surface also have the property that the principal rays of the radiation beams forming the respective points of the image are inclined to the optical axis at angles that increase progressively with the distance of the image point from the axis. The present invention relates particularly to primary optical systems of that type.

A by-product of employing an objective system of the described type is that, as the scan proceeds along the length of the primary image, the direction of the radiation beam forming the scanned image element swings through an appreciable angle about the center of curvature of the image. That cyclic variation in beam direction persists through the optics that perform the scan and through the remainder of the optical system. That is, each successive optical image that is formed between the scanning mechanism and the radiation terminus, although stationary in position and typically of substantially point size, subtends a conical radiation beam or beams which oscillate angularly about the image as a center in synchronism with the scan movement. That swinging movement of each radiation cone must be accommodated by providing adequate effective aperature in any relay optical system or systems which ultimately deliver the radiation to the radiation terminus.

A highly effective system of the described type is described and claimed in the copending U.S. Pat. application, Ser. No. 197,857, now U.S. Pat. No. 3,817,593 of which the present applicants are coinventors. That system employs a spherical primary mirror, a tilted reflective Schmidt corrector positioned at the center of curvature of the mirror and defining the entrance pupil of the system, and a rotating scanning wheel carrying roof angles at its periphery. The diverging beam from the roof scanner is focused to the radiation sensor by a spherical relay mirror at approximately unity magnification.

Such a Schmidt system has the advantage of producing a spherically curved primry image concentric with the mirror surface. When such a system is provided with the usual aperture stop at the common center of curvature of the image and mirror, the principal ray of the radiation beam forming each point of the image passes through that center, so that each such beam is effectively an axial beam as it strikes the mirror. The image is then subject only to spherical aberration, which can be corrected in known manner by a reflective or refractive corrector positioned optically at the center of curvature, or by elements having spherical symmetry about that center. Such an imaging system is particularly satisfactory for providing a highly corrected image over a wide field.

However, a disadvantage in the basic Schmidt configuration for scanning systems of the present general type is the limited correction of spherical aberration that can be attained when all optics must be of reflective type. A reflective Schmidt corrector in such a system must be tilted relative to the entering beam. An appreciable tilt across the direction of scan is required, especially in large aperture systems, to make the entering beam clear the primary mirror; and the periodic scan movement of the beam introduces an effective tilt of the corrector in the plane of scan, especially for large scan angles. Each of those factors, and especially their combination impose limits upon the overall image quality.

A further disadvantage of the previously available systems, which applies even when only moderate resolution is required, is the lack of adaptability to pointing control. A typical requirement of such systems is that the incoming scan beam be capable of being angularly shifted by means of an adjustable auxiliary flat mirror. Such a pointing function may be employed merely for beam adjustment, or may be driven in known manner laterally of the scan direction and in suitable time relation to the main scanning action to provide auxiliary scanning in an orthogonal dimension. In systems of the described type the pointing mirror must be placed optically ahead of the Schmidt corrector, increasing the bulk and mass of the system. When a tilted reflective FIG. 1 is a schematic plan representing an illustrative image scanning system embodying certain aspects of the invention.

FIG. 2 is a schematic section on the line 2—2 of FIG. 1;

FIG. 3 is a schematic fragmentary section at enlarged scale on the line 3—3 of FIG. 2;

FIG. 4 is a schematic drawing corresponding generally to a portion of FIG. 3 at further enlarged scale;

FIG. 5 is a schematic drawing, corresponding to a portion of FIG. 2 at enlarged scale and representing a modification;

FIG. 6 is a schematic fragmentary plan illustrating an aspect of the invention;

FIG. 7 is a schematic diagram corresponding to portions of FIG. 1, reproduced in simplified form for clarity of illustration;

FIG. 8 is a schematic drawing corresponding generally to FIG. 5, but representing a modification employing a single moving optical part;

FIG. 9 is a schematic diagram illustrating optical properties of FIG. 8;

FIG. 10 is a schematic drawing representing a further modification;

FIG. 11 is a section on line 11—11 of FIG. 10;

FIG. 12 is a schematic modification of FIG. 4;

FIG. 13 is a schematic drawing representing another embodiment of the invention;

FIGS. 14 and 14A are schematic perspectives representing an enlarged portion of FIG. 13 and a modification thereof;

FIG. 15 is a schematic section on line 15—15 of FIG. 13;

FIG. 16 is a fragmentary plan based on FIG. 13; and

FIG. 17 is a schematic drawing representing a modification.

DESCRIPTION OF ILLUSTRATIVE EMBODIMENTS

1. Basic Configuration

FIGS. 1 to 4 represent schematically a preferred embodiment of the invention in an optical strip scanning system for scanning a relatively narrow strip of a scene, represented schematically at 18 in FIG. 1. The direction of scan is parallel to the plane of FIG. 1, which will be assumed to be horizontal for clarity of description, though the scanning system may actually have any desired orientation with respect to gravity.

Scene strip 18 is imaged at 20 by the spherically concave primary mirror 10. The elongated primary image 20 lies in the spherically curved principal image surface 24, which is concentric with mirror 10 about the common center of curvature 12. If scene 18 is assumed for clarity to be at an effectively infinite distance, the radius of curvature $R_o$ of image 20 is one half that of the mirror, and equals its focal length. The primary optical axis 11 is defined by center 12 and the central point 20a of image 20. The cross-scan width of image 20 may be appreciable, but is assumed infinitely narrow for clarity of description, so that the image appears in section in FIG. 2 as a point.

The entrance pupil of the system lies optically on axis 11 at center of curvature 12, and is indicated schematically in that position at 14 in the drawings. However, the actual physical aperture stop defining pupil 14 is preferably located in a conjugate focal plane, as more fully described below. Pupil 14 typically occupies slightly less than half of a generally circular area having point 12 as center, the lower boundary of the pupil being a straight horizontal line at 15, just above that center. The entire space below axis 11 is then available for accommodating the scanning and relay optics to be described.

Primary image 20 may be considered to comprise a linear series of elemental image areas, formed by respective incoming radiation beams 22, each composed of essentially plane parallel radiation. The component beams have similar, generally semicircular cross sections defined by pupil 14, and have respective beam axes or principal rays 21 which intersect each other and primary axis 11 at center 12. Thus, for example, the central element 20a of image 20, corresponding to the central elemental area 18a of scene strip 18, is formed by the component beam 22a, whose principal ray 21a as seen in FIG. 1 coincides with primary axis 11; and the typical end element 20b of the image, corresponding to the end element 18b of the scene strip, is formed by the beam 22b. The principal ray 21b of beam 22b forms with primary axis 11 the angle $\theta_o$, which is the half angle of the scanned field. The radiation cone forming each element subtends the aperture half-angle $\phi_o$ corresponding to the radius of pupil 14.

Primary image 20 is scanned optically by movement along its length of successive ones of the series of roof reflectors 34, which are mounted on the periphery of scanning wheel 30. That wheel is journaled on the vertical wheel axis 31 which intersects primary axis 11 perpendicularly. The wheel is typically driven continuously at a selected speed by means indicated schematically at 26. Each roof reflector 34 comprises two plane reflective faces meeting at right angles at an edge or vertex 35. Reflectors 34 are mounted coaxially with their vertex edges parallel to wheel axis 31 on a vertex circle 36 of radius $R_1$. Suitable radiation shielding, to be described below, preferably insures that only one roof reflector is effective at a time, and shielding is provided elsewhere in the system as required.

As each roof reflector 34 moves along its circular path 36, successive portions of primary image 20 are optically transferred to the neighborhood of optical axis 11, forming a transferred image which intersects that axis and moves across it. A stationary field stop, positioned optically on axis 11 at that moving scan image, selects for delivery to the rest of the system the radiation from a small elemental image area, which is indicated at 38. That image element may be referred to as the exit element of the scan image, or simply as the exit image. That selective action effectively scans the moving scan image, and hence scans the length of fixed primary image 20. The described field stop, though acting optically at the exit image, is conveniently positioned physically at a subsequent conjugate image, typically at the final image delivered to the radiation terminus. The terminus itself may act as field stop, or a field limiting diaphragm may be provided, as indicated schematically at 72 in FIG. 2. The area of that field stop typically defines the size of the respective image elements into which primary image 20 is effectively dissected by the scanning action.

It is a property of the roof reflector that any two conjugate images, such as exit image 38 and the primary image element to which it corresponds, are spaced from the roof vertex 35 at equal distances and in precisely opposite directions. Under the particular condicorrector is used the closest the pointing mirror can be brought is beside the primary mirror, where its size must be inconveniently large to match the beam cross section.

SUMMARY OF THE INVENTION

The primary purpose of the present invention is to reduce or eliminate the various disadvantages, including those outlined above, that have been encountered in previously available image scanning systems. That is accomplished in large part by stabilizing the radiation beam at some point subsequent to the optical scanning mechanism. Such stabilization substantially or completely eliminates the swinging movement of the radiation comes, so that the radiation beam passing between each pair of successively formed images traverses a fixed area of each optical surface of the intervening relay optics. Such stabilization of the beam within at least a portion of the relay system offers several unique advantages, some following directly from the stabilization and others requiring additional coordinated modification of the system.

A variety of mechanisms may be employed to produce beam stabilization of the described type. For example, a mirror, typically of plane configuration, may be mounted at or adjacent an intermediate image in the relay portion of the system, with means for periodically swinging the mirror about an axis in its plane in synchronism with the beam movement to be compensated. As a further example, a series of mirrors may be mounted at the periphery of a wheel in such position that wheel rotation causes the mirrors to intercept the radiation beam successively. The wheel is driven at such speed that rotation of the active mirror just compensates the swinging movement of the beam. Further features of such stabilizing mechanisms are described below.

One significant advantage of such stabilization of the radiation beam is the corresponding reduction of the aperture required in any relay or other optics traversed by the stabilized beam. Especially in systems which provide a wide scan angle, this greatly relieves the constraints upon the types and detailed design of relay optics that can be employed. Also, stabilization of the radiation cone at the terminus tends to make the response of a sensor more uniform, or reduces the solid angle that must be illuminated if the radiation terminus is a source.

The described stabilization of the beam also makes it possible to provide a stationary real image of the entrance pupil within the relay portion of the system. The physical aperture stop for the system can then be placed at that image. More significantly, in connection with a concentric primary objective such as a spherical mirror, the Schmidt corrector can be positioned at a stabilized image of the entrance pupil, and will then function optically as if it were at the conventional position at the center of curvature of the primary objective. By using such a referred Schmidt corrector, which typically incorporates the physical aperture stop, the primary objective can receive entering radiation directly from the scene to be scanned, appreciably reducing the volume and weight of the overall system. And if a pointing mirror is required, it can be placed physically at or near the entrance pupil, where the entering beam is of minimum size.

Moreover, when the Schmidt corrector is of reflective type and must therefore be used off-axis, its deflection angle can be made optically negligible when the corrector is physically incorporated in the relay portion of the system, thus eliminating the aberrations that resulted in previous systems from the larger tilt angle required of a reflective corrector in the entrance beam. Further, oblique incidence varying with scan cannot degrade the correction.

A further aspect of the invention replaces the previously described single roof reflectors by triple reflectors, each comprising an assembly of three plane reflectors mounted in mutually orthogonal relation. Such triple reflectors thus embody three roof reflectors arranged with their roof edges mutually perpendicular. They perform scanning in generally similar manner to single roof angles or reflectors. However, triple reflectors are also capable of offsetting the beam axis a constant distance in the cross scan direction. Such lateral offset can be arranged to assist in separating the incident and reflected beams, thereby relieving radiation congestion at the scan wheel and increasing the available effective aperture of the system. Also, with the respective triple reflectors mutually displaced in the axial direction, a raster scan can be produced. Those useful functions are available in addition to the capability, shared with the single roof reflectors, of scanning an arcuate image with precise accuracy of focus when the radius of the scan wheel is one half the radius of curvature of the image.

It has been discovered further that, when beam stabilization is produced by rotation of a circular array of mirrors, the slight periodic shift of focus that typically accompanies the rotary movement of such mirrors can be compensated by suitable selection of the radius of the scanning wheel. Not only does such focus compensation improve the average resolution, but in practice it leads to reduction in the radius of the scanning wheel, thereby reducing the mass of the driven structure and typically permitting reduction in the overall dimensions of the system.

Considerable flexibility in design is available in a rotary array of beam stabilizing mirrors, especially when they are assigned a suitable optical power. As an example, the array of scanning roof or triple reflectors and the array of beam stabilizing mirrors can be mounted on a unitary wheel structure, insuring correct relative speed and phase relationships between them. Both arrays may have a common radius when the mirrors are convexly curved at two thirds of that common radius. Moreover, the proper wheel radius is then only one third of the radius of curvature of the primary image. Although that configuration introduces certain aberrations which vary periodically with the scan movement, the great simplicity of the structure and the relatively small size of the single moving part more than overcome that disadvantage when only modest imagery is required.

BRIEF DESCRIPTION OF THE DRAWING

A full understanding of the invention, and of its further objects and advantages will be had from the following description of certain illustrative manners of carrying it out, reference being had to the accompanying drawings, in which:

tion that the radius of curvature of vertex path 36 is just half that of primary image 20, that is, when $R_1 = R_o/2$, the geometry is such that exit image 38 maintains a fixed position on axis 11, independently of the roof wheel rotation. Hence, as explained in the above identified copending application, the optical scanning mechanism does not impose any focal error upon the final image. Moreover, throughout the scan the optical scan angle is then directly equal to the rotational roof wheel angle that produces it. Hence, uniform wheel rotation scans image 20 at a uniform rate.

Figure 1:
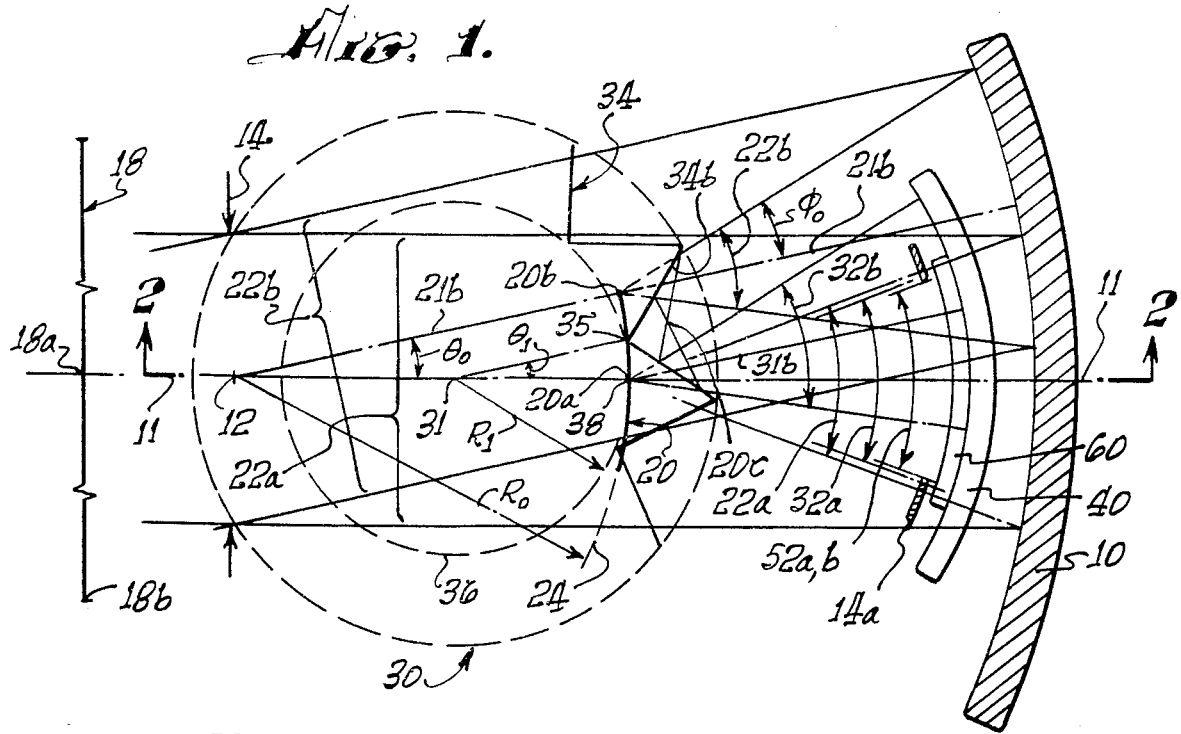

The position of roof wheel axis 31 relative to the primary image is arbitrary within limits set primarily by vignetting at the roof reflectors, and can be selected to produce the desired axial position of exit image 38. If the wheel axis is displaced a distance D along axis 11, exit image 38 is displaced 2D in the same direction. However, the above described consequences of the relation $R_1 = R_o/2$ continue to hold. In the present drawings vertex circle 36 is generally shown tangent to primary image 20 for clarity of illustration. Exit image 38 then coincides with central element 20a of the primary image. In practice, however, it is usually preferable to displace the exit image slightly from image 20. Also, as will appear more fully below, certain aspects of the present invention utilize a departure of $R_1$ from the previously preferred value of $R_o/2$.

In FIG. 1, for example, the exit image is represented at 38. With roof reflector 34b in the position shown, incoming component beam 22b is reflected successively by the two roof faces, effectively transferring primary image end element 20b first to a real image at 20c and then to a virtual image at 38. The described field stop 72, acting optically at 38, then limits the effective radiation from the scanning apparatus to the exit beam 32b, which is oppositely parallel to incoming beam 22b. Thus, the principal ray 31b of the exit beam forms with axis 11 the same angle $\theta_o$ as incoming principal ray 21b. At each roof position the principal ray of the exit beam similarly forms with axis 11 the same angle as the incoming principal ray to the primary image element being scanned. Thus, although the position of exit image 38 is typically fixed, the exit cone 32 from that image swings periodically about a generally vertical axis through a half-angle equal to the scan half-angle $\theta_o$; and the scanning action selects from the total incoming radiation an effective beam 22 that shifts over the surface of primary mirror 10 in synchronism with the scan and parallel to the direction of scan.

Figure 2:
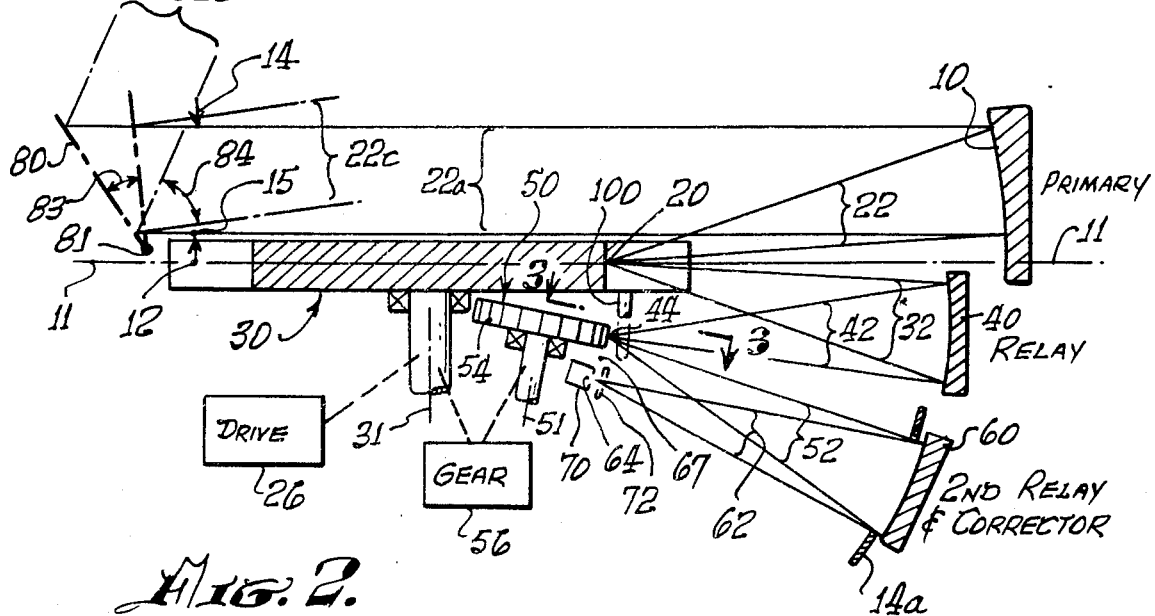

All the components of reflected beam 32 are received by the concave relay mirror 40 and are returned as the convergent beam 42 to form an intermediate image at 44 (FIG. 2). That image is spaced below its conjugate exit image 38 by slight tilting of the relay mirror. Image 44 moves perpendicular to the plane of FIG. 2 in time with the scanning action, in correspondence to the described movement of the scan image at 38. Hence those two images can be referred to collectively as moving images. On the other hand, the field stop, typicaly shown at 72, selects corresponding fixed elemental areas of both images. Thus, considered from the viewpoint of the selected radiation, both images are effectively fixed. During the course of each scan, the component beams at 32 and 42 which correspond to the selected image elements 38 and 44 swing about those elements, forming varying angles with axis 11, as seen in FIG. 1. The beams thus strike somewhat varying areas of relay mirror 40, which must be horizontally elongated accordingly.

2. Beam Stabilization

One aspect of the present invention provides means for stabilizing that swinging movement of the radiation beam resulting from scanning of image 20, typically performed by optical scanning wheel 30. Such stabilization is typically accomplished by providing a reflective surface which intercepts the beam at a position close to intermediate image 44 or a subsequently formed conjugate image, and angularly driving that surface to deflect the beam through an angle which varies in such a way as to compensate the periodic swinging movement of the beam.

As illustratively shown in the present system, that stabilizing action is produced by the series of plane mirrors 54, which are mounted on the periphery of the stabilizing wheel 50 with their surfaces facing radially outward in angularly spaced relation. The wheel is driven in such time relation to the movement of scanning wheel 30 that the reflected beam 52 is constant in direction. Such drive is represented schematically at 56, and may comprise any coupling mechanism capable of maintaining accurately a selected speed and phase relationship between wheels 30 and 50. Drive 56 may comprise a precision gear train, and is so designated for definiteness in FIG. 2; or may utilize a more sophisticated coupling means, such as an electrical servo drive with control signals that are derived from the outputs of digital encoders on the respective wheel shafts, for example.

Reflected beam 52 is separated from incoming beam 42 by slight tilting of stabilizing wheel axis 51. The beam is then refocussed in a second relay stage by the concave mirror 60 via the beam 62 at the image 64. That image is shown typically as the final image, received by the sensor 70, but it may be otherwise processed as desired. The diaphragm 72 typically acts as field stop, limiting the effective area of image 64 and also of its conjugate images 44 and 38, as already indicated. The relatively simple mirror configuration represented in FIG. 2 is satisfactory for many purposes. A wide variety of functionally equivalent arrangements are available for satisfying special requirements. In particular, one or more of the beams may be folded by small mirrors, and additional relay stages may be provided. FIG. 5 represents at enlarged scale an illustrative example, in which the beams 52 and 62 are folded by the respective plane mirrors 57 and 67, permitting wheel axis 51 to be tilted in the opposite direction from that shown in FIG. 2. Such an arrangement will sometimes reduce the angles at which the mirrors 40 and 60 or their equivalents must be tilted, and may be preferred when optimum definition is required.

FIG. 3 shows in plan and at enlarged scale or portion of stabilizing wheel 50 and the radiation beams which interact with it. The two typical incoming component beams 42a and 42b, which correspond to central and end image elements 20a and 20b of FIG. 1, are shown separately in FIG. 3, and have principal rays 41a and 41b separated by the same angle $\theta_o$ discussed above. The dashed line 54a represents a mirror surface in the symmetrical position in which it would reflect central beam 42a directly back on itself as the beam 52a. Wheel 50 is shown in solid lines with the mirror 54b turned counterclockwise from 54a through the angle $\theta_2$, where $$\theta_2 = \theta_a/2 \tag{1}$$

Beam 42b is then reflected as the beam 52b in a direction which coincides with beam 52a. Thus, the beam oscillation associated with rotation of scanning wheel 30 of FIG. 1 through the angle $\theta_1$ is counteracted by rotation of stabilizing wheel 50 through the angle $\theta_2$.

Such stabilization offers numerous advantages. As seen best in FIG. 1, the mirror 60 and any subsequent relay stages that may be used require only sufficient aperture in a horizontal plane to accommodate the stationary beam 52, in contrast to the appreciably larger horizontal aperture or mirror 40 which must receive beam 32 at all positions of its swinging movement. Also, it is usually advantageous to have the radiation received by sensor 70 limited to a stationary solid angle. Although the scan half-angle $\theta_a$ is usually small enough to hold any directional errors of measurement to acceptable limits, and correctional procedures are often available in a subsequent electronic system, it is obviously preferable to eliminate such errors at the source. A corresponding advantage results when radiation terminal 70 comprises a source of radiation which traverses the system in the opposite direction to that assumed in the previous description. Under that condition, beam stabilization reduces the solid angle that must be uniformly illuminated by the source at 70 from a value corresponding to mirror 40 in FIG. 1 to that corresponding to mirror 60.

3. Aperture Definition and Spherical Aberration

In presence of the described beam stabilization the two optical functions of aperture definition and correction of spherical aberration, which previously had to be carried out by optical elements physically located at entrance pupil 14, can be performed instead at a position of the stabilized beam having a conjugate focal relation to that pupil. Second relay mirror 60 is typical of such a position, each point of that mirror corresponding optically to a point of entrance pupil 14. Therefore a physical aperture stop at mirror 60 provides a fixed virtual entrance pupil, limiting the radiation that can traverse the system in a manner equivalent to a diaphragm at 14. The rim of mirror 60 may form such a stop, or a separate diaphragm may be provided, as indicated at 14a.

In accordance with the well-known Schmidt principle, the spherical aberration imposed by primary mirror 10 on each entering component beam, such as 20a and 20b, is distributed over the cross section of the beam in the same pattern. Since all beams coincide at the entrance pupil 14, a corrective element at 14 can correct all beams equally, at least to a first order approximation. With stabilization of the exit cone the same correction can be performed downstream of stabilizer 50 to eliminate the spherical aberration introduced ahead of scanner 30 by primary objective 10. In the present system the surface of the concave second stage relay mirror 60 directly incorporates the slight departure from spherical shape that is required, in accordance with known principles of optical design, to correct the spherical aberration contained in intermediate image 44 and to produce a well defined image at 64.

That novel provision of a referred Schmidt corrector in a system of the present general type permits the elimination of residual aberrtions that were inherent in the prior art. A corrector located physically at entrance pupil 14, as in the prior art configuration, is normal to the incident radiation beam, at most, only for objects at the center of the scanned field. At oblique angles of scan the corresponding oblique incidence of radiation upon such a corrector degrades the corrective action in general proportion to the cosine of the angle, significantly limiting image quality at large scan angles. When such a corrector must be of reflective type, it must be tilted in the cross scan direction so that the incident radiation will clear the primary mirror. The resulting image degradation increases rapidly with relative aperture of the system.

In the present system, on the other hand, beam stabilization enables the radiation beam to be incident upon the corrector in a uniform and virtually axial direction for all angles of scan. Since images 44 and 64 are typically small, both can be placed optically close to the effective center of curvature 67 of second relay mirror 60. A corrector associated with that mirror is then used virtually on axis and can thus provide a high order of correction. Scanning action does not degrade that action, since swinging movement of the radiation cone has been eliminated by beam stabilization. In this respect, the referred Schmidt corrector of the present invention behaves like a corrector journaled at the center of curvature of the primary mirror and driven in synchronism with the scan beam.

By thus removing both aperture stopping and corrective functions to a referred Schmidt position on the opposite side of scanning device 30 from primary mirror 10, the invention leaves the region at virtual entrance pupil 14 free to accommodate other optical functions. For example, a plane pointing mirror 80 can be pivotally mounted on a horizontal axis 81 at or near pupil 14 as indicated in phantom lines in FIG. 2. Rotation of mirror 80 through the typical angle 83 swings incoming beam 22c through the angle 84. Such angular variation may be used for simple adjustment, or may be driven in conventional manner to provide a second coordinate of scanning movement in the plane of FIG. 2. Alternatively, axis 81 of the pointing mirror may be parallel to the plane of FIG. 2, providing rotary adjustment in the plane of the scan fan. For either type of pointing control, placement of pointing mirror 80 in the neighborhood of entrance pupil 14, where the incoming radiation has minimum cross sectional area, greatly reduces the required mirror size as compared with previous configurations.

4. Focal Compensation

A further aspect of the invention takes account of the slight shift of focus that is produced by rotation of the active stabilizing mirror between the positions represented as 54a and 54b in FIG. 3. A portion of that drawing is shown in FIG. 4 at greatly enlarged scale. For clarity of illustration, only the principal rays 41a and 41b of the respective incoming beams are shown. If image 44 is assumed for illustration to lie in the surface of the undeflected mirror at 54a, then the surface of the mirror when at maximum active deflection $\theta_2$ at 54b lies in front of that image by a distance which can be expressed approximately as $R_2\theta_2^2/2$, where $R_2$ is the radius of each mirror from wheel axis 51. Incoming beam 42b (represented by ray 41b) is then reflected as if from an image 44a spaced that same distance in front of the mirror, producing a corresponding shift of focus.

Thus, since $\theta_2 = \theta_o/2$ from (1) the total first order longitudinal image displacement $D_2$ is $$D_2 = R_2 \theta_o^2 / 4 \tag{2}$$

The image shifts through that distance $D_2$ from 44a to 44 and back to 44a as each stabilizing mirror crosses axis 41a, producing a periodic focal variation.

For many purposes that shift of focus can be neglected, especially if $R_2$ is relatively small. However, the invention permits first order correction of the described image shift. That is accomplished simply by suitable modification of the value of $R_1$, the radius of scanning wheel 30.

FIG. 6 is a schematic diagram illustrating the optical relationships at the scanning wheel when $R_1$ departs from the normally preferred value of $R_o/2$. The smaller value $R_o/3$ is assumed for illustration, and the half-angle $\theta_o$ of image 20 is shown larger than in FIG. 1 for clarity of representation. The roof reflector 34c has its vertex 35 on the circular path 36a on the radius drawn from wheel axis 31 at an angle $\theta_1$ such that the roof vertex 35 is spaced half as far from axis 11 as image end element 20b. That is, $$R_1 \sin \theta_1 = (R_o \sin \theta_o)/2 \tag{3}$$

or, to a first order approximation, $$R_1 \theta_1 = R_o \theta_o / 2 \tag{3a}$$

The incoming oblique ray 28 to 20b is drawn parallel to the roof axis of symmetry 27, providing a simple construction of reflected rays 28a and 28b for locating the point 38a on axis 11 to which image element 20b is transferred by the reflector. Alternatively, point 38a can be found by projecting a straight line through 20b and 35 to axis 11. The distance $D_1$ from 38a to the desired image point 38, typically at central image element 20a, then represents the focal shift due to selection of $R_1$ equal to $R_o/3$ rather than $R_o/2$. By geometry, $$D_1 = 2R_1(1 - \cos \theta_1) - R_o(1 - \cos \theta_o)$$

from which, to a first order approximation, $$D_1 = R_1 \theta_1^2 - (R_o/2) \theta_o^2 \tag{4}$$

Setting $D_1$ and $D_2$ equal, as given by (4) and (2), respectively, and using (3a), we obtain the value of $R_1$ required to compensate the focal error produced by the stabilizing mirrors at radius $R_2$:

$$R_1/R_o = 1/(2 + R_2/R_o) \tag{5}$$

Solution of (5) for $R_2/R_o$ gives the condition for focal compensation when $R_1$ is given:

$$R_2/R_o = (R_o/R_1) - 2 \tag{5a}$$

5. Parameter Values

If the angular half-aperture $\phi_o$ of the radiation beam at each element of the primary image does not exceed the half-angle $\theta_o$ of scan, it may be feasible to fit each roof reflector within the angular interval $2\theta_1$ of the periphery of the scanning wheel. However, if $\phi_o$ exceeds $\theta_o$ the radiation beam tends to be vignetted at the ends of each scan unless the reflectors extend farther from the vertex than can be accommodated in that angular interval. That can be seen from FIG. 1, and more clearly from FIG. 7, in which the lower edge of reflected beam 32b extends below axis 11. The additional angle, if any, required by each roof reflector depends upon $R_1 R_o$ as well as $\theta_o$ and $\phi_o$, and can usually be determined more conveniently by simple ray tracing than by calculation. The actual half-angle between adjacent roof vertices on the scanning wheel will be denoted $\phi_1$ (FIG. 7). Similarly, the half-angular separation of adjacent mirrors 52 on stabilizing wheel 50 will be denoted $\phi_2$ (FIG. 3), and is usually larger than $\theta_2$, the half-angle through which the active mirror turns during each actual scan of image 20.

Assuming that there are $N_1$ roof reflectors and $N_2$ stabilizing mirrors mounted at uniform respective angular intervals $2\phi_1$ and $2\phi_2$ on their respective wheels, $$N_1 \phi_1 = N_2 \phi_2 = 180° \tag{6}$$

The respective angular velocities $V_1$ and $V_2$ of the scanning wheel and stabilizing wheel must satisfy the dual relation $$\frac{V_2}{V_1} = \frac{N_1}{N_2} = \frac{\theta_2}{\theta_1} \tag{7}$$

to maintain their elements in proper phase relation, and to move those elements through respective angles $2\theta_1$ and $2\theta_2$ during each scan of image 20. From (3a) and (6), since $\theta_2 = \theta_o/2$ from (1), and rewriting (7) for convenience, we obtain the multiple relation:

$$\frac{V_2}{V_1} = \frac{N_1}{N_2} = \frac{\theta_2}{\theta_1} = \frac{\phi_2}{\phi_1} = \frac{R_1}{R_o} \tag{8}$$

It is usually convenient to consider $\theta_o$, $R_o$, $\phi_o$ and $V_1$ as independent variables, which may be assigned values arbitrarily on the basis of conventional requirements. Once values for those parameters have been assigned, it is useful to assume a provisional value for $R_1$, somewhat smaller than $R_o/2$ and such that the corresponding provisional value of $R_2$ obtained from (5a) is suitable. One may then determine, as by ray tracing, the larges number $N_1$ of roof reflectors that can be fitted into the periphery of the scanning wheel without vignetting a beam of aperture $\phi_o$ at the extreme angle of scan $\theta_o$. It may be desirable under some conditions to increase $N_1$ slightly even at the cost of some vignetting in order to improve the fractional duty time, or scan efficiency, which is given by $$E = \frac{\theta_1}{\phi_1} = N_1 \frac{\theta_o}{360°} \frac{R_o}{R_1} \tag{9}$$

using (3a) and (6).

After $N_1$ has been selected, a value is assumed for $N_2$, somewhat larger than $2N_1$. The resulting fraction $N_1/N_2$ gives a definite value for $R_1$ from (8), and a definite value for $R_2$ is then obtained from (5a). If $R_1$ is much different from the provisional value that had been assumed, $N_1$ may need adjustment. Also, if $R_2$ is not a convenient value, for instance if the stabilizing wheel is not small enough to fit under the scanning wheel without interference with its drive shaft, $N_2$ may need adjustment. However, since $N_1$ and $N_2$ are integral, only a few trials are usually sufficient to obtain optimum values. That integral relation also greatly facilitates design of coupling mechanism 56 between the scanning and stabilizing wheels.

As an example, and without intending any limitation upon the method of design or the values that may be found useful, a system might be required for scanning a field of $\theta_o = \pm 125$ milliradians with a primary mirror of focal length $R_o = 24$ inches and an aperture half-angle of $\phi_o = 250$ milliradians. Use of 20 roof angles, giving $\phi_1 = 157$ milliradians is found to produce vignetting at the scan extremes. Full coverage is obtainable with $N_1 = 19$, or $\phi_1 = 165$ milliradians. An acceptable number of stabilizing mirrors is found by similar test to be $N_2 = 41$. Thus $N_1/N_2 = 0.4634$, which establishes $R_1 = 11.12$ inches and $R_2 = 3.79$ inches. With those values, $\theta_1 = 135$ milliradians from (3a) and the scan efficiency $\theta_1/\phi_1$ has the highly satisfactory value of about 82 per cent.

6. Single Optical Moving Part

It is sometimes useful to employ stabilizing mirrors 54 that are convex rather than plane, as represented schematically at 54c in FIG. 9. The radius of curvature $R_3$ of those mirrors is then an additional parameter, enhancing the freedom of design. Such curvature increases the angle $\theta_2$ through which the stabilizing wheel 50 must rotate to compensate a given beam angle $\theta_o$. Previous equation (1) becomes $$\theta_2 = \frac{\theta_o}{2} \frac{R_3}{R_3 - R_2} \quad (1.4)$$

from which it is clear tht $R_3$ can not equal $R_2$. The resulting increase in focal shift $D_2$ (compare FIG. 4) is partially canceled by the mirror curvature, so that first order equation (2) becomes $$D_2 = \frac{R_2 \theta_o^2}{4} \frac{R_3}{R_3 - R_2} \quad (2.4)$$

A particularly useful special case employing convex mirrors occurs when the number of stabilizing mirrors $N_2$ is equal to the number of scanning roof reflectors $N_1$, with $\theta_2 = \theta_1$. The stabilizing mirrors can then be mounted coaxially on the same shaft as the scanning wheel, completely eliminating precision coupling mechanism 56. When the radius of curvature $R_3$ of the mirrors is 3/2 the radius $R_2$ of the stabilizer wheel, the roof reflector vertices and the stabilizing mirrors can be mounted on their common shaft at equal radii $R_1 = R_2$ from the shaft axis. The image motion induced at the stabilizer can then be substantially compensated by making that common radius of scanner and stabilizer equal to $R_o/3$, that is, one third the radius of curvature of the primary image, rather than one-half as in the basic configuration of the prior art. That very considerable reduction in the size and the resulting moment of inertia of the single optical moving part is a significant advantage for many applications.

FIGS. 8 and 9 represent schematically a specific illustrative configuration for producing scanning and radiation beam stabilization with a single optical moving part. The wheel 30a is journaled on the axis 31 with drive means 38 and carries not only the circular array of roof reflectors 34 but also the convex stabilizing mirrors 54c, which are peripherally mounted via the flange structure 86. Roof reflectors 34 are typically as already described in construction, mounting and operation. Mirrors 54c have their centers of curvature 59 on respective diameters drawn through the center of each mirror and wheel axis 31 (FIG. 9). The auxiliary plane mirrors 57 and 67 correspond generally to those of FIG. 5.

Insofar as intermediate image 44 lies in the surface of convex mirrors 54c, the mirror curvature has no direct effect upon the optical definition. However, the periodically varying focal shift $D_2$ provides the optical power of the mirror with a slight leverage, causing a correspondingly slight aberration of the image due to oblique incidence upon the mirror surface. That aberration cannot readily be corrected, but is negligible when only moderate resolution is required.

7. Single Mirror Beam Stabilization

FIGS. 10 and 11 illustrate schematically a modification whereby beam stabilization is produced by a single mirror 90, which is caused to oscillate about an axis 91 perpendicular to the plane of the swinging movement of the beam. That axis of oscillation preferably lies in the reflective face of the mirror and passes through intermediate image 44. The image then lies in the mirror surface throughout the oscillatory movement, eliminating any periodic focal shift. The incident and reflected beams can be separated in the same manner as in FIG. 2 or 5, for example. However, with axis 91 in the plane of the mirror, the median position of the mirror can be oblique with respect to the beam without introducing optical aberrations, facilitating separation of the beams. As shown illustratively in FIG. 11, the incoming beam is represented at 42b in solid lines at one extreme of its swinging movement, and at 42c in phantom lines at the other extreme. The corresponding extreme positions of the mirror, shown at 90 and at 90c, reflect those beams in the common direction indicated as reflected beam 52, stabilizing the beam. Relay mirror 60 is preferably figured to incorporate Schmidt corrective action, as described above.

Stabilizing mirror 90 may be driven in any suitable manner to produce a sawtooth type of oscillatory movement, whereby it swings through the indicated arc in an active direction at a strictly controlled rate which is typically constant and precisely compensates the swinging movement imposed on beam 42 by the action of scanner 30 or its equivalent. The reverse movement of mirror 90 may follow an arbitrary time couse and is preferably much faster than its active movement.

Illustrative drive mechanism for mirror 90 comprises a pen motor 92 of known construction, such as is conventionally used to drive the pen of a recording device in accurate correspondence to an input current or voltage of arbitrary waveform. A control voltage of ramp form is generated in the conventional ramp circuit 94 in uniform time relation to passage of the successive roof reflectors 34 along image 20. For example, a synchronizing trigger pulse may be delivered to circuit 94 by the timing switch 95, which is operated by the timing cam 96 on the shaft of scanning wheel 30 with cam lobes corresponding to the respective roofs. Ramp generator 94 preferably includes circuit means for adjusting the amplitude and slope of the output ramp function to obtain proper correlation to the actual beam movement to be compensated. Alternatively, the numeral 96 may represent a precision optical encoder producing a digital signal representing typically at least several hundred pulses during the scan action of each roof reflector. The resulting multi-digit signal, suitably counted up or down, is supplied to ramp circuit 94, which then comprises a digital-to-analogue converter and produces a multi-step function that is accurately defined and effectively smooth. The same optical encoder may be employed in known manner to control the drive of scanner wheel 30 itself. The ramp generator may further be designed in accordance with known principles to introduce slight nonlinearity in the ramp function to any extent that may be required to match the beam movement.

8. Transition Period and Internal Radiant Calibration

Between successive scan lines or cycles performed by adjacent roof reflectors 34 there is a transition period during which the radiation reaching exit beam 32 may be spurious, either due to reduction of its intensity by vignetting or due to superposition of radiation from both roof reflectors. More particularly, as roof reflector 34b moves counterclockwise beyond the scan end position shown in FIG. 7 (or FIG. 1) the primary image element that is conjugate to exit image 38 shifts beyond the scanned portion of image 20. The incident radiation reaching that image limb is progressively reduced by vignetting at entrance pupil 14 and the edge of primary mirror 10. Also, beam 22 tends to be vignetted at one outer edge 39 of the active roof reflector, while exit beam 32 is vignetted at the opposite edge 41. Radiation reaching exit beam 32 via an active roof reflector is thus progressively cut off after completion of each scan line. Corresponding vignetting action controls the progressive injection of radiation into exit beam 32 by the next roof reflector as it moves into active position. The spurious transition radiation is preferably eliminated by optical switching of the beams. The above identified copending patent application describes and claims mechanism by which the radiation reflected by each roof reflector may be separately switched.

One aspect of the present invention is a particularly simple and effective alternative optical switch mechanism for blanking the radiation beam during the transition period between scans. As shown schematically in FIG. 5, that mechanism comprises a series of opaque shields 100 peripherally mounted on scanning wheel 30 in position to intercept one or both of beams 42 and 52 closely adjacent intermediate image 44. That arrangement has the advantage of requiring no additional moving parts, and since image 44 is inherently small in the scan direction, the shields produce a sharp cutoff. Each shield is typically positioned symmetrically with respect to the axial plane of symmetry between a pair of adjacent roof reflectors, and extends on both sides of that plane far enough to obstruct the radiation during the entire transition period.

Alternatively, light switching shields can be mounted on stabilizing wheel 50 rather than on scanning wheel 30, in position to cover the junctions between adjacent pairs of stabilizing mirrors 54. The shields may then comprise edge portions of the mirrors which are rendered non-reflective in any suitable manner. In particular, the mirror edge portions can be cut away to form recesses 104 between adjacent mirrors 54, as shown schematically in FIG. 12, blanking the reflected beam during the transition period. Intermediate image 44 is then preferably at 44c, where it is in the plane of the switching edges of recesses 104 when the mirrors 54 are in their extreme beam deflecting positions, indicated at 54b in FIG. 12. With the mirrors as mid-scan position 54a, the reflected beam 53 then diverges from the virtual image 44d, giving the same periodic focal shift $D_2$ as in FIG. 4. That image placement sharpens the switching action, at least partly compensating the lower peripheral speed of the stabilizing wheel as compared to the scanning wheel. When the scanning and stabilizing wheels are integrated, as in FIG. 8, that distinction disappears.

In systems which employ a single oscillating stabilizing mirror, beam switching can be performed by shields mounted on the scanning wheel in essentially the same manner as discussed in connection with FIG. 5. Such shields are indicated schematically in FIG. 10 at 100a. However, the action of such shields are more satisfactory in a configuration producing vertical separation of beams 42 and 52, for example as in FIG. 5, rather than horizontal separation as in FIG. 11. Alternatively, with suitable folding of final beam 62 in FIG. 11, shields such as 100a in FIG. 10 can be arranged to intercept that final beam as it enters terminus 70. It is noted further that the present type of beam switching can be provided also in systems which do not employ beam stabilization. In FIG. 5, for example, image 44 may be considered to represent a final image at a radiation terminus 50, with shields 100 passing closely in front of that final image.

During the transition period, radiation terminus 70 "sees" only shield 100 or its equivalent, which thus can serve as a calibration standard to which the terminus is exposed between every pair of scans, or between selected pairs. Shield 100 may, for example, comprise an oblique mirror which reflects radiation from a single or multiple level synthetic calibration scene via relay mirror 60 to terminus 70. A further aspect of the invention provides a preferred calibration arrangement whereby the radiation passing between the calibration scene and terminus 70 or its equivalent is twice reflected by relay mirror 60.

Such an arrangement is illustrated schematically in FIGS. 13 to 15. FIG. 13 also illustrates modified scanning optics, described below in section 9. A synthetic calibration scene 130 is produced in conventional manner by the accurately controlled radiant source 131. A real image 134 of scene 130 is formed by relay mirror 60 via the diverging beam 136 and the converging beam 138. The auxiliary plane mirror 133 places scene 130 optically at the virtual image 130a, offset in the plane of FIG. 13 from final image 64. Real image 134 is correspondingly offset from intermediate image 44, those two offsets being approximately equal since mirror 60 works at essentially unit magnification. During normal scanning action of the system the calibration radiation is ineffective, passing beyond image 134 and above stabilizing mirror 90, where it may be absorbed by a radiation trap. Alternatively, a shutter may be provided at source 131, opening only intermittently in timed relation to the scanning wheel rotation.

During one or more of the blanking intervals between successive scans an optical device is inserted in front of image 44 for receiving calibrating beam 138, transferring image 134 to 44, and returning the beam at 139 along the path normally occupied by beam 52. By thus substituting the calibration radiation for beam 52, it is delivered precisely to final image 64 and radiation terminus 70. In preferred form of the invention, the device for shifting image 134 to 44 not only produces the shift needed to overcome the constant offset seen in the plane of FIG. 13, but also produces a progressively varying shift perpendicular to that plane. The radiation inserted at image 44 into beam 52 is thereby derived from a progressively varying portion of synthetic calibration scene 130, providing a scanning action. It is then feasible to form scene 130 as a linear array of distinct calibration levels extending perpendicular to the plane of FIG. 13, and to deliver those levels successively to radiation terminus 70 during each calibration cycle. The elongated form of scene image 134 is indicated by a dashed line in FIG. 14, and is typically shown in further detail at enlarged scale in FIG. 15.

The described dual offset function is typically accomplished by mounting cube corner or triple reflector 110 on the bracket 108 on scanning wheel 30a in one or more of the positions already described for the shields 100. As seen in perspective in FIG. 14 and in elevation in FIG. 15, triple reflector 110 comprises the two plane mirrors 112a and 112b, which intersect at right angles at the vertex edge 114a, and the third plane mirror 112c, which forms the 90° vertex edges 114b and 114c with the other two. The three edges 114 meet at the vertex corner 113, where they form equal angles with the principal axis of symmetry, not explicitly shown. Any ray incident upon a triple reflector within its effective aperture is reflected successively by the three plane reflectors, and is thereby returned oppositely parallel to its incident direction, the incident and reflected rays being equally and oppositely spaced from the vertex corner in a common plane. When an incident radiation beam forming a real or virtual image is reflected by a triple reflector, the image after reflection is transferred to a conjugate position equally offset in the opposite direction from the vertex corner. The described optical performance of a triple reflector is essentially independent of its orientation, so long as adequate effective aperture is preserved.

It is usually convenient to mount triple reflector 110 with its axis of symmetry in an axial plane of scanning wheel 30a and in such azimuth orientation that the outer edge 115 of triangular mirror 112c lies in a horizontal plane. With that edge positioned between beams 42 and 52, as shown, spurious beam 42 is not intercepted by the optical face of the mirror, but by its rear face after reflection from mirror 90. In order to provide adequate effective aperture in all scanning positions, mirrors 112a and 112b are typically four-sided with generally vertical side edges 116, at which beam switching occurs, and generally horizontal top edges 117. Other orientations of the triple reflector can be used, with suitable modification of the individual mirror configurations.

Triple reflector 110 is so mounted that scan wheel rotation carries its vertex corner 113 along a path midway between calibration image 134 and intermediate image 44. At each point of that path a particular elemental area of image 134, shown as 134a in FIGS. 14 and 15, is tranferred to the fixed position of image 44. The reflected beam 139, diverging from 44 as virtual image, thus corresponds to a progressively shifting portion of the calibration scene. Beam 139 is focussed by relay mirror 60 at the plane of field stop 72, which performs the function already described of passing to radiation terminus 70 only the limited image area corresponding to the field stop aperture. As during normal scanning action, the field stop thus defines the effective area of the final image at 64 and also that of each of the conjugate images upstream of it at 44, 134 and 130a.

In FIG. 15 triple reflector 110 is represented near the start of a scan cycle, corresponding generally to FIG. 14. Synthetic calibration scene 130 appears as its image 134 formed by relay mirror 60. Scene 130 is horizontally elongated, typically comprising a linear array of distict areas 132 of different calibration levels of intensity or wavelength. Field stop 72 is also represented as imaged by mirror 60 at 72a, directly below scene image 134. The image 74a of the field stop aperture is further imaged by triple reflector 110 at 74b, defining the elemental area 134a of scene image 134 that is selected at that moment of the scan for delivery to radiation terminus 70. Images 74a and 74b are displaced equally in opposite directions from vertex corner 113 of the reflector, a relation which continues throughout the scan. As the vertex corner moves to the left in FIG. 15 a distance indicated by the arrow 120a, aperture image 74b sweeps twice that distance along the path indicated at 124, scanning scene image 134. Since the radiation beam may be vignetted near the ends of that path, at the inception and completion of the blanking switching, scene image 134 preferably occupies only its central portion. The described multi-level calibration can be repeated as often as after every scan, or as seldom as once each revolution of scan wheel 30a.

Final image 64, as well as the previous images to which it is conjugate, may have any desired form. As shown illustratively via its image in FIG. 15, field aperture 74 is elongated in the cross scan direction, defining three unit image areas 65, which may be separately sensed in terminus 70. The terminus then typically includes conventional optical means for separating the radiation received at those image units and supplying the distinct beams to respective transducers, which may respond to distinct spectral ranges, for example, producing separate video signals for each range. Calibrating radiation areas 132 then typically include suitable calibration signals for each such transducer.

It is convenient to refer collectively to the triple reflector of FIG. 14 and the roof reflectors previously described as "orthogonal reflector assemblies," since they are optically similar in their capability for precisely reversing the direction, or one component of the direction, of incident radiation beams, and for translating images in sharply definable respects that are remarkably insensitive to the reflector orientation with respect to its vertex corner, or edge. A triple reflector may be considered to comprise three roof reflectors with their roof edges mutually orthogonal. Thus, the described optical action of triple reflector 110 in FIG. 14 may be viewed as comprising two components. The variable horizontal scanning component of image translation, corresponding to the arrow X, is performed primarily by the roof reflector formed by mirrors 112a and 112b with vertex edge 114a and is analogous to the scan action of the simple roof reflectors 34 of the previously described figures. Also, the constant vertical component of image offset, corresponding to the arrow Y, may be considered to be performed by the compound roof reflector formed by mirror 112c working in combination with the two other mirrors at the folded roof edge 114b, 114c.

Further illustrating the latter view, FIG. 14A represents a modification of the calibration apparatus of FIG. 14 which is useful when only a single level of calibraion is required. The roof reflector 110a is mounted on scan wheel 30a with its vertex edge 111 directed tangentially in position to pass midway between intermediate image 44 and the calibration scene image 134 formed by the incident beam 138 from relay mirror 60. The lower edge 115a of reflector assembly 110a is positioned, like edge 115 in FIG. 14, between normal beams 42 and 52. With that arrangement, the spurious radiation beam 42 is blocked after reflection in mirror 90 at the rear face of reflector 110a, and calibration radiation is delivered as the reflected beam 139 in place of beam 52. The action is thus essentially like that of FIG. 14 except for omission of the scanning component X of the beam displacement. Hence the image of the calibration scene that is delivered to field stop 72 is essentially stationary, and the required area of the calibration scene itself is correspondingly reduced. Roof reflector 110a ordinarily subtends so small an angle at the scan wheel axis that the curvature of its path produced only minor optical effects.

9. Scanning by Triple Reflectors

In accordance with a further aspect of the invention, illustrated schematically in FIGS. 13, 16 and 17, the scanning orthogonal reflector assemblies, which comprised simple roof reflectors 34 in the previously described embodiments, are formed as triple reflectors 140, typically similar in general configuration to triple reflectors 110 of FIGS. 13 to 15. Like FIG. 1, FIG. 16 shows the active orthogonal reflector assembly in position to transfer end point 20b of primary image 20 to the virtual image 38, which is the selected exit element of the moving scan image.

The vertical component of the offset of image 38 relative to primary image 20 permits insertion of the stationary plane mirror 148 for folding beam 32 downward to clear entering beam 22. In the embodiment of FIG. 13 relay mirror 40 is repositioned correspondingly, as indicated schematically, and the resulting convergent beam 42 is again rendered approximately horizontal by the stationary mirror 149. Beam stabilization is performed by the oscillating mirror 90 essentially as in FIG. 10, except that the stabilized beam 52 remains in the plane of FIG. 13. Auxiliary relay mirror and corrector is indicated only schematically at 60, returning the radiation to final image 64 at radiation terminus 70, essentially as previously described.

Triple reflector 140 of FIGS. 13 and 16 is turned 180° azimuth relative to reflector 110 of FIG. 14, so that upper edge 145 of reflector 140 corresponds to the straight horizontal lower boundary 115 of mirror 112c in FIG. 14. As shown in FIG. 13, the position of each triple reflector 140 is preferably such that upper horizontal edge 145 lies just above and generally tangent to primary image 20. That position permits minimum projection of the reflector structure above the plane of primary image 20 and primary optical axis 11, since the entering radiation beam 22 has minimum vertical width as it passes the aperture edge 145. Obscuration of the parallel beam approaching primary mirror 10 (FIG. 2) is thereby minimized, and the available effective aperture of the system is correspondingly increased to virtually a full semicircle.

Triple reflectors 140 are mounted on scanning wheel 30a with their vertex corners 143 at a common radius $R_1$ from the wheel axis 31. Radius $R_1$ is selected, in the manner already described, with suitable regard for the radius of curvature $R_o$ of primary image 20 and other parameters of the system, to maintain uniform focus of the overall system as each orthogonal reflector assembly scans the primary image. The described radial position of the scanning triple reflectors with respect to primary image 20 is then obtained by shifting the entire scanning wheel 30a and its axis 31 away from image 20. Scan image 38 is thereby shifted inward from image 20 by twice that spacing. Except for that constant shift of the scan image, the focal relationships previously described are not affected by such shifting of the scanning wheel axis, either in the present or the previous embodiments.

A further modification of the invention, represented schematically in FIG. 17, illustrates the capability of triple reflectors to perform the described image scanning function in combination with a raster scan in the cross-scan dimension. Such raster scan is accomplished by mounting triple reflectors at a plurality of different axial positions on the scanning wheel. For clarity of illustration, only two typical extremes of the raster scan configuration are shown explicitly in FIG. 17. The primary optical axis is shown at 11, with primary image 20 corresponding to image 20 of FIG. 16, for example. It is assumed however, that image 20 actually has an appreciable width in the cross-scan dimension, extending vertically at least from 20c to 20d. Triple reflector 150 is shown in solid lines in position to transfer to scan image 38 the lower edge strip 20c of the primary image area. A second triple reflector is shown in dashed lines at 150a in axial position to transfer to scan image 38 the upper edge strip 20d of the primary image area. If the triple reflectors are mounted on the periphery of a scanning wheel alternately inthe two axial positions 150 and 150a, the radiation in output beam 32 is derived alternately from the lower and upper edge strips of the entire primary image area.

It is clear without detailed illustration that additional image strips at any desired number of intermediate positions may be scanned by triple reflectors mounted on the scanning wheel at intermediate axial positions. The maximum number of such raster intervals is limited only by the total number of triple reflectors carried by the scanning wheel, and any integral submultiple of that number may be provided. Each of those raster scans may be further subdivided into elementary image areas of smaller vertical dimension by providing a cross-scan array of transducers at radiation terminus 70, as illustrated schematically at 65 in FIG. 15, for example. Hence the raster scan may provide as large a number of image strips as may be required.

The angular extent of the raster scan in the cross-scan direction is limited primarily by considerations of available effective aperture, both of the primary objective and of the individual triple reflectors. It is generally advantageous, for maximum utilization of the cross-scan capability, to orient the triple reflectors in azimuth like triple reflector 110 of FIGS. 13 to 15, rather than at 180° from that position like reflector 140 in FIGS. 13 and 16. The lower boundary 155 of the effective aperture is then a horizontal edge of a single reflector. Also, the axis of the scan wheel in FIG. 17 is so positioned that scan image 38 is at a larger radius from that axis than primary image 20, reducing the beam cross section at auxiliary mirror 148. Optimum adjustment of those and other parameters will vary with such factors as the required angular aperture of the system and the angle covered in the primary scan dimension. Even appreciable intrusion of the triple reflectors into the otherwise available system aperture is often acceptable in a system providing a raster scan while retainging high optical definition.

In addition to the above described specific capabilities associated with the illustrative embodiments of FIGS. 13 and 16 and FIG. 17, triple reflectors have the great advantage as optical scanning devices that they permit relaxed alignment tolerances. For optimum definition a roof reflector must be precisely aligned in angular tilt about the optical axis to produce the desired orientation of the scan line in space; and tilt about the direction of scan causes improper illumination of the corrector. On the other hand, a scanning triple reflector, once the three plane reflectors have been accurately oriented relative to each other, can be tilted as a unit about any axis and through any angle, subject only to vignetting of the beam. The only critical tolerances are on the positioning of the cube apex.

For clarity of description the invention has been described with specific reference to propagation of radiation from the region to be scanned toward the radiation terminus 70, which is then typically a suitable radiation responsive means. It will be recognized without detailed description that the invention is useful also for radiation propagation in the opposite direction. The present claims sometimes refer to an optical system as "mutually imaging" an object and an image, or an image and an object, thereby emphasizing that the conjugate relationship between them is mutual and that radiation may proceed in either direction. Those skilled in the art will appreciate that the particulars of the preceding description, and of the accompanying drawings, are intended only as illustration, and not as a limitation upon the proper scope of the invention, which is defined in the appended claims.

We claim:

1. Apparatus for optically scanning a region, comprising
    optical objective means for mutually imaging said region and a primary image,
    optical scanning means movable with respect to said optical objective means for producing and periodically moving a scan image corresponding to at least an elongated strip of the primary image, said scan image moving periodically in a scan direction longitudinal of the strip,
    means for moving said optical scanning means with respect to said optical objective means
    field means fixed with respect to said optical objective means for selecting an effective radiation beam corresponding to an elemental area of said moving scan image,
    aperture means for defining the aperture of the effective radiation beam, the position of the effective radiation beam at said objective means varying with the movement of said scan image, optical relay means for mutually imaging said elemental image area or an optical conjugate thereof and a radiation terminus, said optical relay means including beam deflecting means positioned optically substantially at said elemental image area or an optical conjugate thereof and movable with respect to said optical objective means for veriably deflecting the radiation beam in a plane optically parallel to said scan direction and
    means for controlling the movement of said beam deflecting means in such time relation to the movement of said optical scanning means that the effective radiation beam between said radiation terminus and said beam deflecting means is substantially stationary with respect to said optical objective means.

2. Apparatus according to claim 1 wherein said radiation terminus comprises a source of radiation which traverses the apparatus in the direction from the radiation terminus toward said region to be scanned.

3. Apparatus according to claim 1 wherein said radiation terminus comprises radiation transducer means responsive to radiation which traverses the apparatus in the direction from said region to be scanned toward the radiation terminus.

4. Apparatus according to claim 1 in which said aperture means comprise beam limiting means positioned between said radiation terminus and said beam deflecting means.

5. Apparatus according to claim 4 including a pointing mirror mounted for rotational movement adjacent an optical conjugate image of said beam limiting means between said objective means and said region to be scanned.

6. Apparatus according to claim 1 wherein said objective means produce spherical aberration substantially independent of said variation of the beam position at the objective means, said system including
    image corrective means between said radiation terminus and said beam deflecting means for compensating said spherical aberration.

7. Apparatus according to claim 6 wherein said image corrective means comprise a figured optical reflective element mounted in approximately on-axis relation to the radiation beam.

8. Apparatus according to claim 6 wherein said optical relay means comprise a generally spherical concave relay mirror, said image corrective means comprising figuring of the surface of said relay mirror.

9. Apparatus according to claim 8 wherein said aperture means comprise means adjacent said relay mirror for defining the beam aperture.

10. Apparatus according to claim 1 wherein said objective means comprise substantially spherically curved reflective means having a center of curvature, said system including
    image corrective means mounted substantially at an optical conjugate of said center of curvature between said radiation terminus and said beam deflecting means for compensating the spherical aberration due to said reflective means.

11. Apparatus according to claim 10 wherein
    said aperture means comprise beam limiting means at an optical conjugate of said center of curvature,
    said apparatus including a pointing mirror mounted adjacent said center of curvature for rotational movement.

12. Apparatus for optically scanning a region comprising
- optical objective means for mutually imaging said region and a primary image,
- aperture means for defining the aperture of the radiation beam, the principle rays for respective points of said image varying in direction progressively across the image,
- optical scanning means movable with respect to said optical objective means for producing and periodically moving a scan image corresponding to at least an elongated strip of the primary image, said scan image moving periodically in a scan direction longitudinal of the strip,
- means for moving said optical scanning means with respect to said optical objective means,
- field means fixed with respect to said optical objective means for selecting an effective radiation beam corresponding to an elemental area of the moving scan image the principal ray for the selected radiation varying in direction in accordance with the direction of the principal ray for the corresponding point of the primary image,
- optical relay means for mutually imaging said elemental image area on an optical conjugate thereof and a radiation terminus, said optical relay means including
- beam deflecting means positioned optically substantially at said elemental image area or an optical conjugate thereof and movable with respect to said optical objective means for variably deflecting the selected radiation beam in a plane optically parallel to said scan direction, and
- means for controlling the movement of said beam deflecting means in such time relation to the movement of said optical scanning means that the principal ray for the deflected radiation has substantially constant direction.

13. Apparatus according to claim 12 wherein said beam deflecting means comprise
- reflective surface means mounted for rotational oscillation about an axis transverse of the radiation beam.

14. Apparatus according to claim 12 wherein said beam deflecting means comprise
- support means journaled on an axis effectively perpendicular to the direction of scan of said primary image and carrying a plurality of peripherally mounted reflective means for successively intercepting and variably deflecting the radiation beam in response to support rotation.

15. Apparatus according to claim 14 including means for limiting the effective apertures of said reflective means such that the radiation beam is effectively blanked between beam reflections by successive reflective means.

16. Apparatus according to claim 12 wherein said optical scanning means include at least one orthogonal reflector assembly mounted for periodic movement along the length of said primary image to offset a progressively varying elemental area of the same to a substantially stationary with respect to said optical objective means position.

17. Apparatus according to claim 12 wherein said beam deflecting means produce a periodic focal variation, said optical scanning means including
- a circular array of optical devices mounted for coaxial rotation with respect to an array axis in such position that the devices successively scan the primary image,
- said optical devices being mounted at a radius from said array axis selected to substantially compensate said focal variation.

18. Apparatus according to claim 17 wherein said optical devices comprise orthogonal reflector assemblies.

19. Apparatus according to claim 12 wherein
- said primary image lies in a generally arcuate surface with radius of curvature $R_o$,
- said optical scanning means comprise a circular array of orthogonal reflector assemblies mounted for coaxial rotation at a radius $R_1$ from an array axis in position to successively scan the primary image,
- said beam deflecting means comprise a circular array of mirrors mounted for coaxial rotation in timed relation to said scanning means in position to successively intercept and variably deflect the radiation beam, said mirrors producing a periodic focal variation, and
- the value of $R_1/R_o$ differs from 1/2 by an amount selected to substantially compensate the focal variation due to said mirrors.

20. Apparatus according to claim 19 wherein said beam deflecting mirrors are plane mirrors facing radially outwardly and mounted at a radius $R_2$, and said radius $R_1$ is substantially equal to $R_o/(2 + R_2/R_o)$.

21. Apparatus according to claim 19 wherein
- said orthogonal reflector assemblies and said mirrors are mounted for coaxial synchronous rotation approximately at a common radius $R_o/3$, and
- said mirrors are convexly curved with a radius of curvature substantially equal to $R_o/2$.

22. Apparatus according to claim 12 wherein
said optical scanning means comprise
- a circular array of orthogonal reflector assemblies mounted for coaxial rotation with respect to an array axis in position to move successively along the length of said primary image and to transfer the same to said moving scan image,
- and optical means for mutually imaging said scan image and a moving intermediate image,
said apparatus including
- a plurality of shield means mounted in coaxial relation to said circular array for intercepting and effectively blanking the radiation beam adjacent said intermediate image during intervals between successive scans.

23. Apparatus according to claim 14 wherein said radiation terminus comprises radiation transducer means, said apparatue including
- means for producing a synthetic calibration scene optically positioned laterally adjacent said radiation terminus and for projecting calibration radiation via said relay means to a scene image optically positioned laterally adjacent said scan image,
- at least one of said shield means comprising optical means for effectively scanning said scene image and for returning calibration radiation via said relay means to said radiation terminus for calibartion thereof.

24. Apparatus according to claim 23 wherein said at least one shield means comprises an assembly of three mutually orthogonal plane reflectors.

25. Apparatus according to claim 24 wherein said scene image comprises a linear array of elementary image areas representing different calibration levels extending generally parallel to said scan image and laterally offset therefrom, said reflector assembly transferring the elementary image areas successively to the elemental area of the intermediate image selected by said field means.

* * * * *